US005954909A

United States Patent [19]

Davidsohn et al.

[11] Patent Number: 5,954,909

[45] Date of Patent: Sep. 21, 1999

[54] DIRECT ADHESIVE PROCESS

[75] Inventors: Daniel Davidsohn, Palm Bay; Scott Lundy, West Melbourne; Rainer Meinke, Melbourne Beach; Gerald Stelzer, Palm Bay; Mark W. Senti, Malabar, all of Fla.

[73] Assignee: GSMA Systems, Inc., Palm Bay, Fla.

[21] Appl. No.: 08/808,388

[22] Filed: Feb. 28, 1997

[51] Int. Cl.$^6$ .................................................. B32B 31/00

[52] U.S. Cl. ............................ 156/293; 156/177; 156/47

[58] Field of Search .................................... 156/166, 171, 156/172, 361, 353, 513, 293, 47; 505/922, 431, 433, 434, 924; 174/125.1; 29/599, 605; 65/381, 453, 479, 486, 539

[56] References Cited

U.S. PATENT DOCUMENTS

| | | | |
|---|---|---|---|
| H383 | 12/1987 | Skaritka | 29/599 |
| 422,550 | 3/1890 | Thomson | 310/264 |
| 3,336,549 | 8/1967 | Kafka et al. | 335/216 |
| 4,040,173 | 8/1977 | McDougall | 29/599 |
| 4,161,062 | 7/1979 | Agatsuma et al. | 29/599 |
| 4,450,024 | 5/1984 | Haghiri-Tehrani et al. | 156/108 |
| 4,529,837 | 7/1985 | Borden | 174/125.1 |
| 4,547,238 | 10/1985 | Lenders | 156/73.2 |
| 4,554,731 | 11/1985 | Borden | 29/605 |
| 4,668,544 | 5/1987 | Takahashi | 428/593 |
| 4,918,801 | 4/1990 | Schwartz et al. | 29/596 |
| 5,160,568 | 11/1992 | Gruber | 156/430 |
| 5,213,646 | 5/1993 | Zsolnay et al. | 156/166 |
| 5,341,555 | 8/1994 | Warden et al. | 29/469.5 |
| 5,426,407 | 6/1995 | Van Den Berg et al. | 335/210 |
| 5,514,308 | 5/1996 | Cohen et al. | 264/442 |
| 5,547,532 | 8/1996 | Wernersbach, Jr. et al. | 156/172 |

*Primary Examiner*—Francis J. Lorin

*Attorney, Agent, or Firm*—Brian S. Steinberger; Law Offices of Brian S. Steinberger

[57] ABSTRACT

Process of adhering conductors such as bare copper wire, copper wire with polymide insulation, and multistrand Kapton wrapped superconductors to mount structures such as a cylinder of arbitrary cross sections, a saddle support, or steel tubes using adhesive layers of material such as BONDALL 16-H, 3M-2090 and T-164. The adhesive layers are subject to b-staging before being used, where it is heated to a temperature of approximately 60–100° C. for approximately ½ hour to approximately one hour. The support surface can optionally be grooved to allow for better wire placement and no wire slippage.

20 Claims, 6 Drawing Sheets

Typical wire path of an individual wire bonded to a cylindrical support tube.
(Prior Art)

Cross section of assembled wire pattern on flat surface.
(Prior Art)

Fig. 3
Prior Art
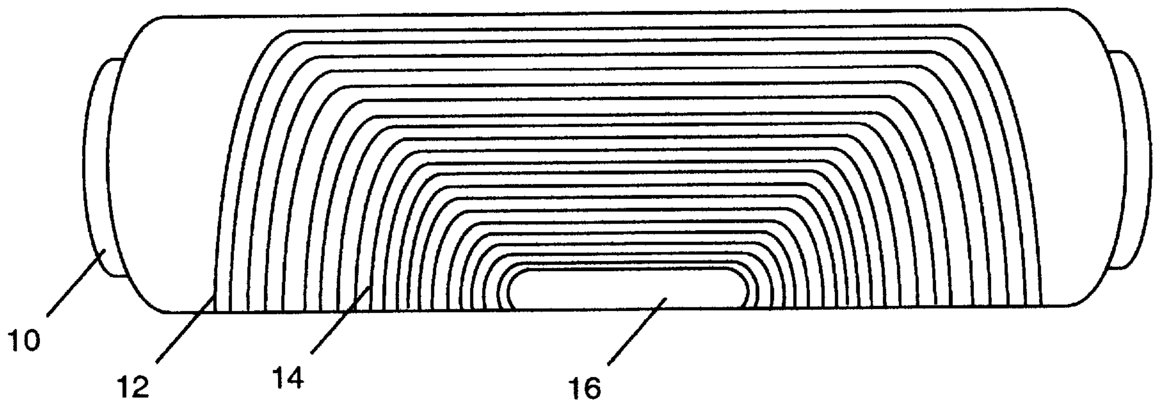
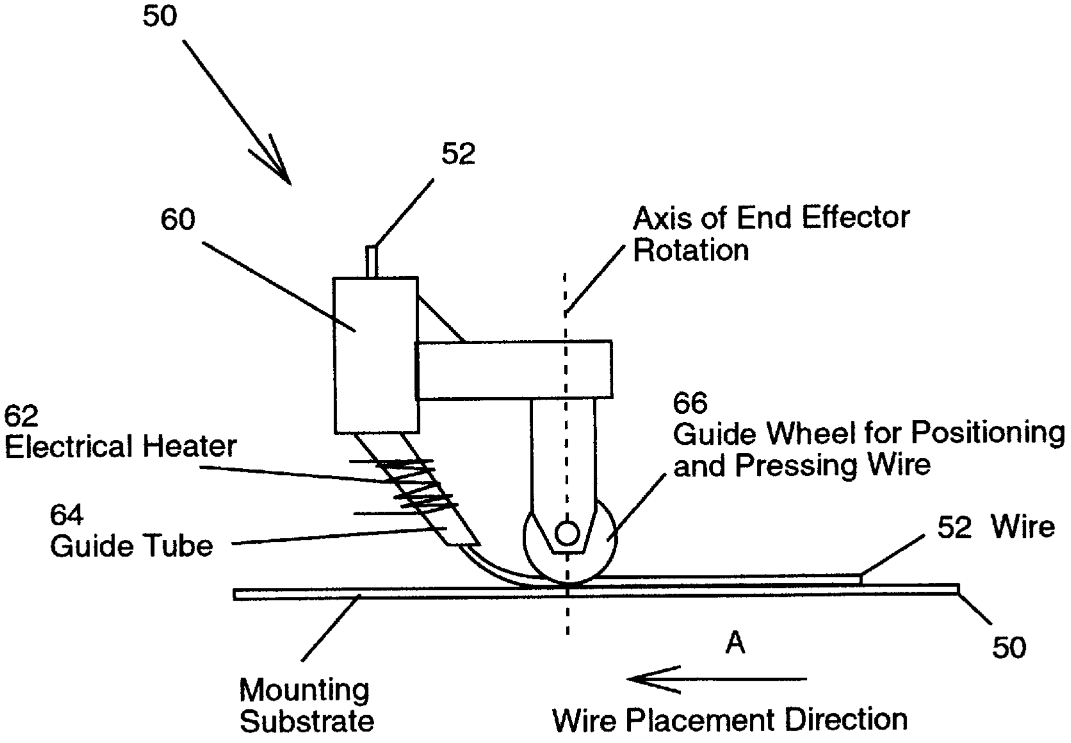
Fig. 4
Prior Art

DIRECT ADHESIVE PROCESS

This invention relates to the automatic manufacture of complex, multi-layer 2 and 3 dimensional wire forms, and in particular to a process of bonding by a direct overlay of adhesive coated and uncoated conductor layers over a cylinder of arbitrary cross section or saddle support structure. This invention was funded in part under Brookhaven National Laboratory Contract No. 776 737.

BACKGROUND AND PRIOR ART

Direct wind technology has been used to manufacture Superconducting magnets for various accelerator projects. Direct wire technology has relied on having each conductor wind being coated with a thermally activated special adhesive such as Bondall 16-H, which sets almost immediately. See column 5, lines 5–11 of U.S. Pat. No. 5,547,532 to Wernersbach, Jr. et al. Special end effectors are then used to position and bond the coated wires together by melting or setting the adhesive. The melting and setting has been done by thermal heating with small electrical heaters or by ultrasonic heating. In order to assemble layers of the conductor stacks together, the adhesive requires thermoplastic properties where the adhesive of the wire in the lower layer melts again and bonds to the adhesive in the wire layer above. The process of coating the conductor with appropriate adhesive is rather complex and requires large towers which are traversed several times to build up the required thickness of the adhesive layer which has to be 5 to 10% of the conductor diameter depending on the chosen spacing of conductors. Since it becomes increasingly difficult and expensive to build up thicker layers of adhesive, the Direct wind technology is limited to small conductor diameters of typically 0.5 mm and the design flexibility of choosing larger gaps between conductors is rather limited. The problem is compounded by the fact that gaps of varying size exist between conductors in a typical coil. Still another problem with the pre-coating process is that the wire guide tube of the end effector can clog up with the heated adhesive. The required pre-coating of the wire compromises the advantages of the Direct wind technology, in particular the important prospect of cost effective and rapid prototype manufacturing.

Various other patents besides Wernersbach, Jr. et al. have attempted to assemble wire coils but also fail to overcome the problems presented above. See for example U.S. Pat. Nos. 4,668,544 to Takahashi; 5,160,568 to Gruber; 5,213,646 to Zsolnay et al.; 5,426,407 to Van Den Berg et al.; and 5,514,308 to Cohen et al.

One of the unique features of the Direct wind technology is its ability to assemble 3-dimensional conductor patterns with high precision. In practice however it has been observed that the first layer which is put on a curved support structure like a cylinder or saddle has the tendency to slip on that surface and part of the intrinsic positioning accuracy given by the wire placement machine and the end effector is lost due to the conductor slippage. The field uniformity of a magnet, in particular a superconducting magnet, is controlled by accurate conductor placement, and any conductor slippage during the magnet assembly process compromises the field uniformity. In early versions of the Direct wind technique the conductor is wound and bonded to a flat substrate and this substrate is then wrapped around a support tube if the coil has a cylindrical shape. This technique does not work for coils with more than 3 layers because the wrapped pattern requires more wire length in the outer layers where the radius of the wrapped cylinder is larger. Furthermore, the precision of the wrapped pattern cannot compete with the direct winding on a 3-dimensional support structure. Thus, there is a loss of wind placement accuracy in the traditional direct wire process due to wind slippage, wire movements on the support structure, or wrapping a 2 dimensional pattern around a tube.

SUMMARY OF THE INVENTION

The first objective of the present invention is to provide a direct adhesive process that is more cost effective than coating conductor with adhesive.

The second object of this invention is to provide a direct adhesive process that can use any available conductor without time consuming coating process.

The third object of this invention is to provide a direct adhesive process where the amount of adhesive can be easily controlled by varying the adhesive film thickness.

The fourth object of this invention is to provide a direct adhesive process that can use larger thicknesses of adhesive as compared to traditional wire coating that is limited to a conductor diameter of about 0.5 mm.

The fifth object of this invention is to provide a direct adhesive process where the gaps of varying size between conductors can be filled in a controlled way with adhesive and no gaps remain as compared to traditional wire coating processes. This is of great importance for superconducting magnets, where voids lead to conductor movements and subsequent quenching of the magnet due to the Lorentz forces in the exited coil. The process also allows to achieve well controlled fill factors of the gaps between conductors. This is of particular interest for superconducting coils where small voids fill up with liquid helium and stabilize the coil against quenching.

The sixth object of this invention is to provide a direct adhesive process where the film adhesive can be reinforced by fiber mat or shredded fiber particles to increase the stability of the assembled conductor pattern. Similar to the previous object this is also of great importance for superconducting magnets.

The seventh object of this invention is to provide a direct adhesive process where the wire guide tube of the end effector does not clog up with heated adhesive.

The eighth object of this invention is to provide a direct adhesive process of cutting grooves in the support structure that enables wire placement on curved surfaces without wire slippage. Wire slippage can also happen on flat surfaces and can be avoided by cutting guide grooves.

The ninth object of this invention is to provide a direct adhesive process of cutting grooves in the support structure that enables increased wire placement precision due to eliminated wire slippage.

The tenth object of this invention is to provide a direct adhesive process of cutting grooves in the support structure that enables improved field uniformity in magnets to be better controlled due to a more precise conductor placement.

The eleventh object of this invention is to provide a direct adhesive process of cutting grooves in the support structure that allows increased conductor placement speed of the first layer.

The twelfth object of this invention is to provide a direct adhesive process of cutting grooves in the support structure that has better quality assurance where the precision of the grooves can be measured and inspected before the conductor is laid.

The thirteenth object of this invention is to provide a direct adhesive process of cutting grooves in the support structure that allows for a stronger mechanical support of the conductors which eliminates quenching below the critical current due to wire movement under the effect of Lorentz forces in the case of superconducting magnets.

The fourteenth object of this invention is to provide a direct adhesive process for adhering conductors to supports which eliminates the need for mandrels, fixtures, tooling, coil potting and vacuum impregnation.

The subject invention uses the same equipment for the precise positioning of the conductor and machining of the grooves. For cutting the grooves the end effector is simply replaced by a precision router.

Further objects and advantages of this invention will be apparent from the following detailed description of a presently preferred embodiment which is illustrated schematically in the accompanying drawings.

BRIEF DESCRIPTION OF THE FIGURES

FIG. 3 is a side view of a prior art assembled coil.

FIG. 4 is a side view of an end effector used to position and heat conductors in the prior art.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

First Embodiment

Figure 1:
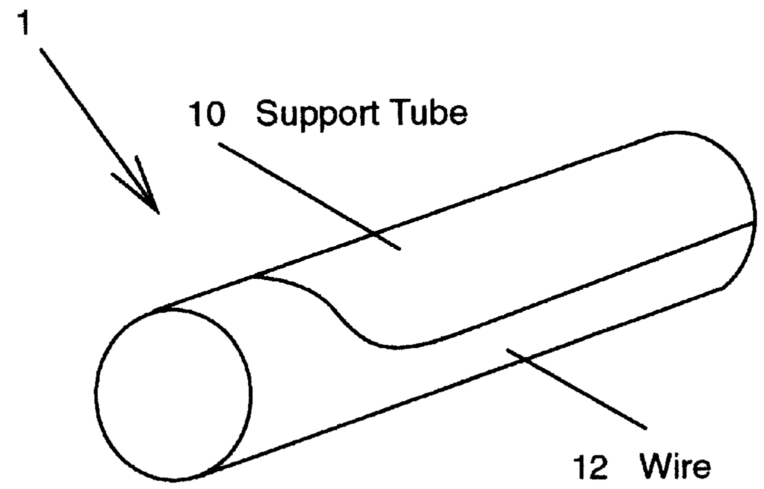
FIG. 1 is a perspective view of a wire path bonded to a cylindrical support tube in the prior art.
Figure 2:
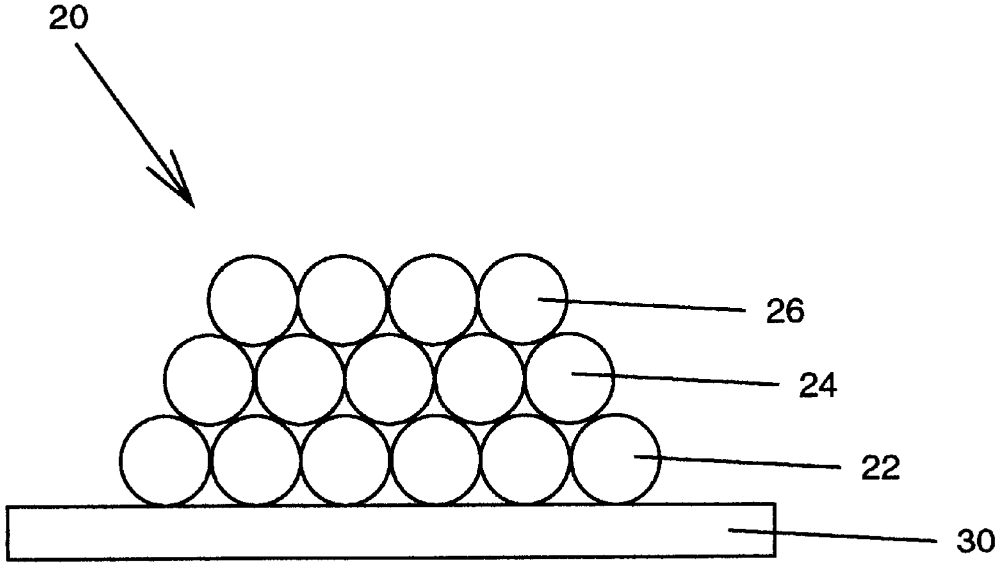
FIG. 2 is a cross-sectional view of a prior art assembled wire pattern on a flat surface.

FIG. 1 is a perspective view 1 of a typical path of a conductor 12 bonded to a cylindrical support tube 10 such as a mandrel used in the prior art which is described in greater detail in the background section of the subject invention. FIG. 2 is a cross-sectional view 20 of a prior art assembled multilayer wire pattern 22, 24, 26 on a flat surface 30. FIG. 3 is a side view of a prior art assembled coil 12, 14, 16 on a cylindrical support tube 10 of FIG. 1 which was assembled using the Direct wind technology described in U.S. Pat. No. 5,547,532 to Wenersbach, Jr. et al, which is incorporated by reference.

The conductors used in the Direct wind process are coated with a thermally activated adhesive which sets almost instantaneously, i.e. in less than one second when the conductor is positioned on the support structure or added to the already existent stack. A typical diameter of the conductor is 0.5 mm. Special end effectors(such as those shown in FIG. 4) are used to position the wire and to bond it in place using different techniques to melt or set the adhesive. These techniques include thermal heating with small electrical heaters and ultrasonic heating. In order to allow the assembly of the upper layers in such a conductor stack, the adhesive has to have thermoplastic properties, i.e. the adhesive of the wire in the lower layer melts again and bonds to the adhesive on the wire above. A schematic end effector system 50 with an electrical heater 62 such as the prior art end effector shown in FIG. 4.

Referring to FIG. 4, prior art end effector 60 heats the coated wire 52 by passing it through a guide tube 64. An electrical heater 62 heats the coated wire allowing it to bond to the substrate 50. A guide wheel 66 is used to position and press the coated wire 52 on a mounting substrate 50.

The described disadvantages of the Direct wind technology are overcome with the subject invention. The "Direct Adhesive" process uses the same end effector equipment(of FIG. 4) for the precise positioning of the conductor as Direct wind technology, but uses standard insulated or uninsulated conductors instead of conductors pre-coated with special adhesives. Examples of conductors are bare copper wire, copper wire with polymide insulation and multistrand Kapton wrapped Superconducting cables.

Just painting the substrate for the coil assembly or an already existing layer with a special glue or adhesive which instantaneously bonds the wire when it is put in place by the end effector is not enough. The fast bonding adhesives contain solvents that attack the bonds between existing conductors and the coil pattern starts to disintegrate. Furthermore, our research indicates that all adhesives with the required characteristics have to be b-staged to achieve sufficiently short bonding times. B-staging is heating the adhesives after it has been applied to the components to be bonded to a temperature of typically 60–100° C. for periods of ½ hour to one hour. In this b-staging process the solvents which are contained in the adhesive evaporate and fast bonding can be achieved. Unfortunately, the released adhesives in a painted adhesive surface attack the already assembled coiled layers and the already assembled wire structure starts to disintegrate.

The inventors have found that this problem can be overcome by using a thermoplastic film adhesive which is b-staged before applying it to the conductor pattern. The films are made from the same adhesives as used for the special coating for the Direct wind process. Thermoplastic adhesive films that can be used with the subject invention include but are not limited to Bondall 16-H, 3M-2290 and T-164.

The adhesive can be painted or sprayed onto a mold release foil to a thickness of approximately 0.01 mm to approximately 0.25 mm or more. For the adhesives mentioned above the best results were obtained by a multipass spray process. Alternatively, the adhesive can be diluted for the spray process with appropriate amounts of acetone without any effect on the final films. Furthermore, to avoid micro cracks in the adhesive under the influence of Lorentz forces the adhesive can be filled with shredded fibers or a fiber mat can be incorporated in the adhesive film.

The sprayed or painted adhesive film can be b-staged by heating it for approximately ½ hour to approximately 1 hour to a temperature of approximately 60° C.–approximately 100° C. depending on the adhesive. When the b-staged adhesive film is totally dry, it can be stripped off the mold release foil, and handled without difficulty. This b-staged adhesive film is then put onto an existing conductor layer.

Our adhesive film was produced in patches with typical dimensions of approximately 20×40 $cm^2$. These patches were laid onto the existing conductor layers and overwrapped with a commercial thermal shrink tape the shrink tape was heated to approximately 60 to approximately 100° C. Due to the thermal contraction of the shrink tape and the applied heat the adhesive film is firmly pressed onto the existing conductor layer and bonded to it.

Figure 5:
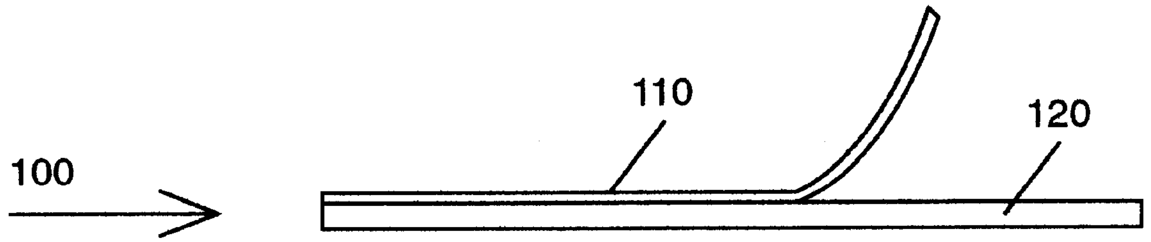
FIG. 5 is a side view of an adhesive film layer on a mold release foil support.

FIG. 5 is a side view 100 of an adhesive layer 120 that was sprayed or painted on a mold release foil 110. Adhesive layer 120 can be removed by peeling the foil 110 off the adhesive layer 120. The conductor heated and positioned by the end effector, melts the film adhesive locally and bonds it to the film and the layer below and to the adjacent conductor in the same layer (see FIG. 5). The conductor is heated to a temperature of approximately 200 degrees C. The winding process proceeds with a uniform speed of approximately 2 to approximately 5 cm per second. A small air jet cools the conductor after it is placed and reduces the adhesive temperature sufficiently to achieve instantaneous bonding.

Figure 6A:
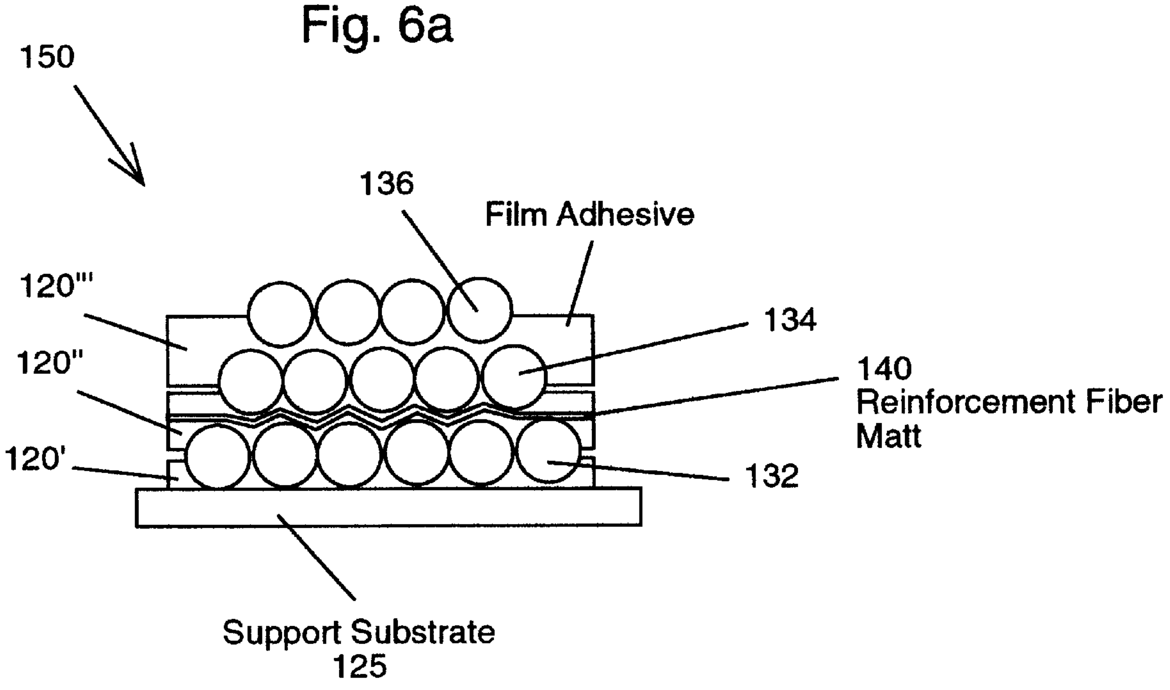
FIG. 6*a* is a cross-sectional side view of an assembled wire pattern with film adhesive and fiber reinforcement on a flat surface according to the subject invention.

FIG. 6*a* is a cross-sectional side view 150 of an assembled wire layer patterns 132, 134, 136 with film adhesive layers 120', 120" and 120'" interspersed therebetween. A fiber reinforcement matt 140 can be inserted as well. The fiber glass mat used had a thickness of approximately 0.04 mm. Good performance was also obtained with embedded fiber particles which are uniformly distributed in the film. The fiber particles have the advantage that the adhesive film is more flexible than with an embedded fiber mat and the film adhesive more easily follows the contours of the existing conductor layers.

Referring to FIG. 6*a*, it is noted that the film adhesive layers 120', 120", 120'" when melted flow around the conductor wires 132, 134, 136 filling voids between the wires.

Figure 6B:
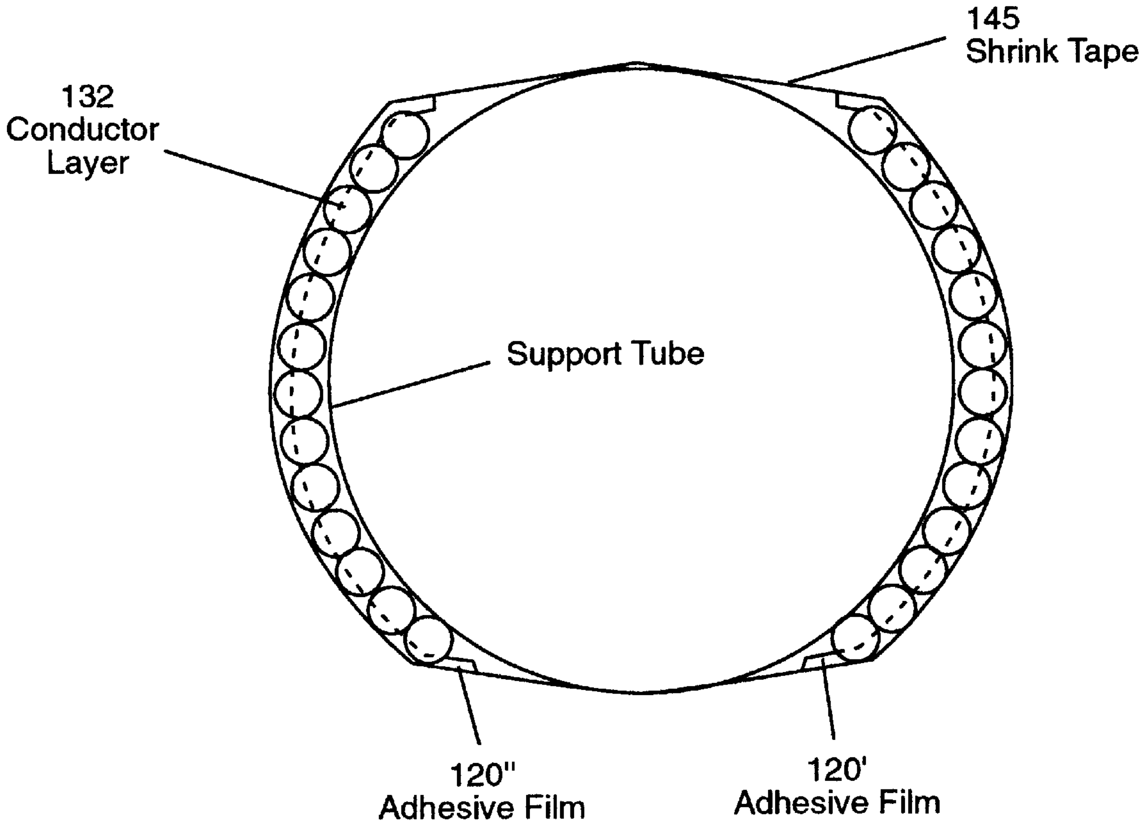
FIG. 6*b* shows a cross-sectional side view of adhesive films and cylindrical conductor patterns where an outer layer of the adhesive film can be effectively bonded to the previous layer and pressed into existing voids of the conductor pattern with the help of shrink wrap tape.

FIG. 6*b* shows a cross-sectional side view of adhesive films 120', 120" with cylindrical conductor patterns 132 where an outer layer of the adhesive film 120" can be effectively bonded to the previous conductor layer 132 and pressed into existing voids of the conductor pattern with the help of shrink wrap foil 145. The shrink wrap foil 145 is wrapped over the outer adhesive film 120" and heated with a heat gun such as those used as a standard paint stripper. The heat shrinkable polyester film has to be heated to a temperature of approximately 120° C. to approximately 160° C. to develop its maximum contraction force. The shrink wrap foil 145 contracts at the increased temperature and presses and bonds the film adhesive to the existing conductor pattern. The shrink wrap is then removed and the winding process resumed. Since the used adhesive is thermoplastic the extra heating during the shrink wrap process does not effect the bonding of the next conductor layer. The film adhesive (even fiber reinforced) is flexible enough to allow nested wire stacking as shown in FIG. 6*a*.

Second Embodiment

It has been observed that the first layer which is put on a curved support structure like a cylinder or saddle has the tendency to slip on that surface and part of the intrinsic positioning accuracy given by the wire placement machine and the end effector is lost due to the conductor slippage. To a lesser extent, slippage is even observed when winding on a flat surface. The field uniformity of a magnet, in particular a superconducting magnet, is controlled by accurate conductor placement, and any conductor slippage during the magnet assembly process compromises the field uniformity. This is also true for the original version of the Direct wind processes in which the conductor is wound and bonded to a flat substrate and this substrate is then wrapped around a support tube if the coil has a cylindrical shape. This technique does not work for coils with more than 3 layers because the wrapped pattern requires more wire length in the outer layers where the radius of the wrapped cylinder is larger. Although the wire slippage is less when the winding is done on a flat surface, the precision of the wrapped pattern cannot compete with the direct winding on a 3-dimensional support structure. Thus, there is a loss of wire placement accuracy in the traditional direct wire process due to wind slippage and limited positioning accuracy of the wrapped pattern on the support structure.

For superconducting accelerator magnets, in particular so-called cosθ-magnets, the mechanical stability of conductors in the innermost layers of the coil is of outermost importance because the field strength and therefore the Lorentz forces on the conductor have their highest values in this layer. For a several tesla magnet these forces are comparable to high pressure gas vessels and reach values of tens to hundreds of tons per meter. Any movement of a conductor under the influence of the Lorentz forces, even by a few micrometers, can generate enough heat to increase the temperature of the conductor above its critical temperature where it becomes normal conducting. If the conductors are precisely nested in the grooves cut into the support tube any movement is significantly hampered and their mechanical stability is guaranteed up to much higher field strength. A recently tested magnet, described in the paper entitled: "Novel Design of Superconducting Helical Dipol Magnet", submitted to the Particle Accelerator Conference, Vancouver, Canada, May 97, reached peak fields inside the coil close to 5 tesla a value never achieved before for cosθ-magnets manufactured with Direct wind technology.

Figure 7:
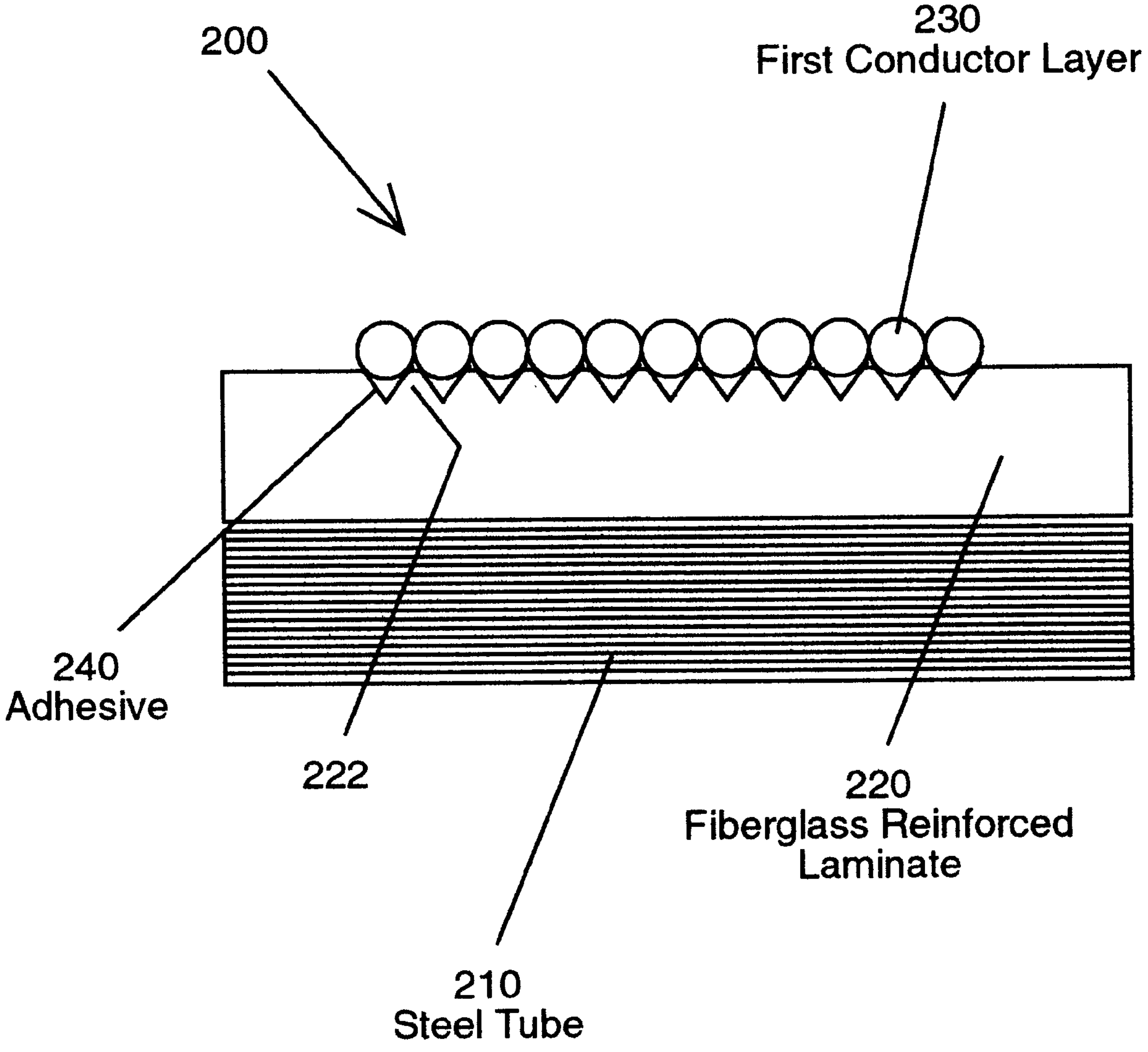
FIG. 7 is a cross-sectional view of a grooved support structure embodiment on a flat surface.

The described problem of loss of wire placement accuracy in the Direct wind process due to wire slippage and wire movements on the support structure can be overcome in the following way. Grooves 222 are cut into the support structure supporting the first layer as indicated in FIG. 7. FIG. 7 is a cross-sectional view of a grooved support structure embodiment 200 includes steel structure mount support 210, a fiber reinforced laminate layer 220 having longitudinal grooves 222 cut therein and the first layer of conductors 230 positioned in the grooves on adhesive layer 240. The laminate 220 wrapped around the support tube structure 210 consists of standard fiber glass reinforced epoxy which is machined to form an accurate cylinder. The grooves can be cut by the wire placement machine itself. For this purpose a router cutting wheel is mounted or substituted on the end effector instead of the guide wheel 66 shown in FIG. 4. The tip of the router can be adjusted to penetrate the surface of the support structure by the required depth of the grooves (approximately half a wire diameter). The same coordinate file, defining the position of the conductor in an appropriate coordinate system which is used for the wire placement is used for cutting the support grooves.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of directly adhering wire conductors that do not have adhesive coatings thereon to a mount structure, comprising:

(a) forming a b-stage adhesive film;

(b) applying the adhesive film to a mount having a support surface with individual grooves;

(c) positioning and bonding wire conductors onto the adhesive film overlying the individual grooves simultaneously, wherein a portion of each of the conductors extends from the grooves.

2. The method of directly adhering of claim 1, wherein the conductor includes:

bare copper wire.

3. The method of directly adhering of claim 1, wherein the conductor includes:

copper wire with polymide insulation.

4. The method of directly adhering of claim 1, wherein the mount includes:

a cylinder.

5. The method of directly adhering of claim 1, wherein the mount includes:

a saddle support.

6. The method of directly adhering of claim 1, wherein the mount includes:

a steel tube.

7. The method of directly adhering of claim 1, wherein the individual grooves in the support surface includes:

longitudinal grooves where the conductors are positioned longitudinally therein.

8. The method of directly adhering of claim 7, wherein the grooved support surface includes:

a fiber reinforced laminate surface having the longitudinal grooves.

9. The method of directly adhering of claim 7, wherein each of the grooves in the grooved surface has a depth of:

approximately half the diameter of the conductor.

10. The method of directly adhering of claim 1, wherein the forming a b-stage adhesive film includes:

heating the adhesive film to a temperature of approximately 60° C. to approximately 100° C. for approximately ½ hour to approximately one hour.

11. The method of directly adhering of claim 1, further including the step of:

(d) adhering a second adhesive film to a layer of the wire conductors.

12. The method of directly adhering of claim 11, further including the step of:

(e) shrink wrapping tape about the second adhesive film.

13. The method of directly adhering of claim 12, further including the step of:

(f) removing the shrink wrapping tape; and (g) positioning and bonding a second wire conductor layer onto the second adhesive film simultaneously.

14. The method of directly adhering of claim 11, further including the step of:

(e) positioning and bonding a second wire conductor layer onto the second adhesive film simultaneously.

15. The method of directly adhering of claim 11, further including the step of:

laying a reinforcement fiber mat between the first wire conductor layer and the second adhesive film.

16. The method of directly adhering of claim 1, wherein the conductors include:

low and high temperature superconductors.

17. A method of directly adhering wire conductors that do not have adhesive coatings thereon to a mount structure, comprising:

(a) forming a b-staged adhesive film;

(b) applying the adhesive film to a mount having a support surface with individual grooves, wherein the mount is chosen from one of:

a cylinder, a saddle support, and a steel tube; and (c) positioning and bonding wire conductors each having a diameter greater than the depth of the individual grooves, onto the adhesive film overlying the individual grooves of the support surface, simultaneously, wherein the conductors are chosen from bare copper wire, insulated copper wire and multistrand wrapped superconductor and a portion of the conductors extends outward from the individual grooves.

18. The method of directly adhering wire conductors of claim 17, wherein the individual grooves in the support surface includes:

longitudinal grooves where the conductors are positioned longitudinally therein.

19. The method of directly adhering wire conductors of claim 17, wherein the individual grooves in the support surface includes:

a fiber reinforced laminate surface having the individual grooves.

20. The method of directly adhering wire conductors of claim 17, wherein each of the grooves in the support surface has a depth of:

approximately half the diameter of each of the conductors.

* * * * *